United States Patent [19]

Yasuoka

[11] Patent Number: 4,540,869

[45] Date of Patent: Sep. 10, 1985

[54] WELDING TORCH

[75] Inventor: Hirotoshi Yasuoka, Aichi, Japan

[73] Assignee: Mitsubishi Denki Kabushiki Kaisha, Tokyo, Japan

[21] Appl. No.: 469,655

[22] Filed: Feb. 25, 1983

[30] Foreign Application Priority Data

Feb. 26, 1982 [JP] Japan ................................. 57-30408
Jul. 14, 1982 [JP] Japan ............................... 57-122616

[51] Int. Cl.³ ............................................. B23K 9/12
[52] U.S. Cl. ............................ 219/124.34; 219/125.1; 901/13; 901/42; 901/49
[58] Field of Search ..................... 219/124.34, 124.22, 219/125.1; 901/13, 10, 42, 49

[56] References Cited

U.S. PATENT DOCUMENTS

| | | | |
|---|---|---|---|
| 3,408,475 | 10/1968 | Fier | 219/124.34 |
| 4,389,561 | 6/1983 | Weman et al. | 219/124.34 |
| 4,404,455 | 9/1983 | Gotoh | 219/124.34 |

FOREIGN PATENT DOCUMENTS

| | | | |
|---|---|---|---|
| 56-41078 | 4/1981 | Japan | 219/124.34 |
| 56-84176 | 7/1981 | Japan | 219/124.34 |
| 1224180 | 3/1971 | United Kingdom . | |

OTHER PUBLICATIONS

Yashukawa Electric Corporation Catalog No. TO-C9-45-2-52, 9/1981, pp. 1-5.

Primary Examiner—Clifford C. Shaw
Attorney, Agent, or Firm—Sughrue, Mion, Zinn, Macpeak & Seas

[57] ABSTRACT

A welding torch for use in a welding robot is prevented from being deformed or otherwise damaged on collision with the work while the welding robot is being taught. The welding torch comprises a housing adapted to be supported at a distal end of the robot arm, a torch nozzle axially movably and rotatably supported at a distal end of the housing, a shaft axially movably and rotatably mounted in the housing and movable in response to rotation and/or axial movement of the torch nozzle, and a switch or switches mounted in the housing and actuatable in response to rotation and/or axial movement of the shaft for generating a signal to stop the movement of the robot arm. When the torch nozzle collides with the work, the switch means is actuated to stop the movement of the robot arm.

21 Claims, 12 Drawing Figures

FIG. 7
FIG. 12
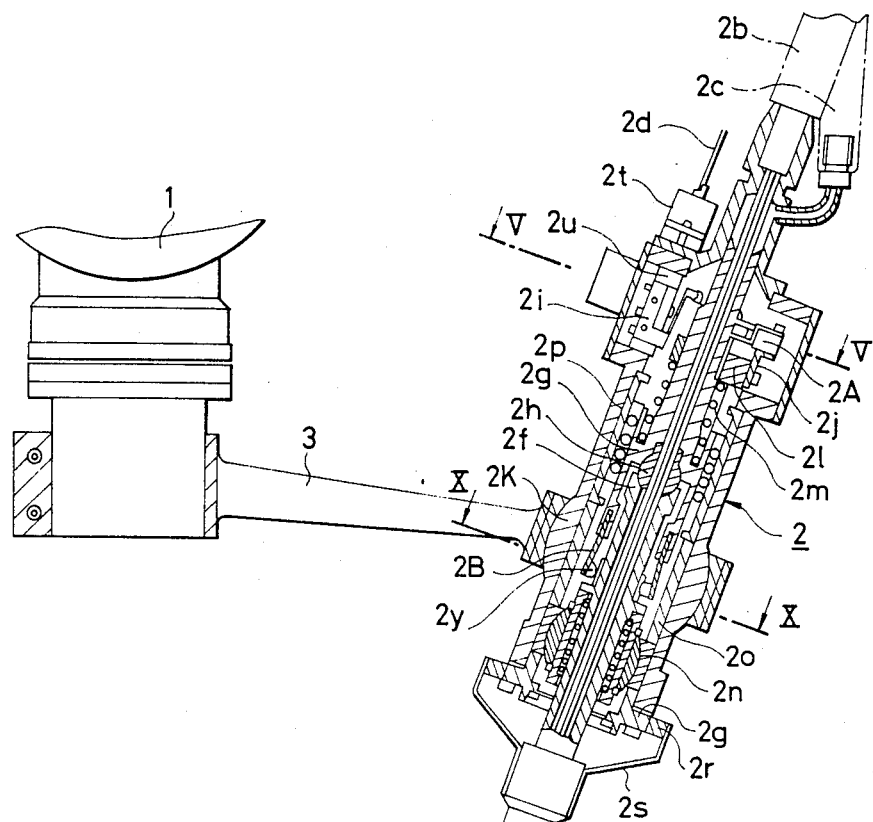
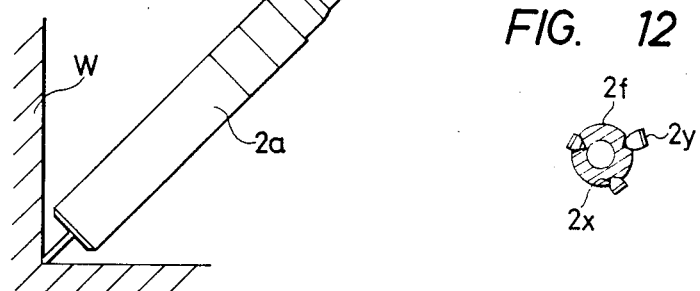

WELDING TORCH

BACKGROUND OF THE INVENTION

1. Field of the Invention

The present invention relates to a welding torch for use in arc welding robots.

2. Description of the Prior Art

Robots have been introduced at a rapid rate in recent years for practical use in arc welding applications. As more and more robot arc welders are used, various unexpected demands have arizen at locations where such welders are used. The present invention has been devised in an effort to meet one of such demands.

The welding process employing articulate arc welding robots that can be "taught," which are most widely used at present, is generally as follows: First, a commercially available integral standard welding torch having a current conducting cable, a welding rod feeder conduit, a gas tube and other components is attached to the end of the arm of the arc welding robot. Then, the robot is "taught" by leading the end of the welding torch through motions along a weld line along which welding is to be performed. During this teaching process, positions along the torch movement path are recorded by a computer associated with the robot to thereby enable the latter to learn welding locations. In a welding operation, the required current, welding rod, and gas are supplied to the torch to effect arc welding successively at the locations recorded in the computer.

In the case of intricate welding work having more than 100 welding positions which the robot has to learn, the robot training process usually takes the operator a few hours. During such a long teaching period, there is a greater tendency for the operator to allow the tip end of the welding torch to collide with the work inadvertently or through error. When the welding torch hits the work, the torch becomes deformed or damaged, and the operator has to repeat the teaching process performed before the accident occurred.

SUMMARY OF THE INVENTION

It is an object of the present invention to provide a welding torch for use in robot arc welders which includes means for preventing the welding torch from being deformed or otherwise damaged when colliding by mistake with the work during the teaching process, so that successive welding positions following the collision can be taught to the robot without repeating the teaching process prior to the accident.

The above object can be achieved by a welding torch comprising a housing adapted to be supported on a distal end of a robot arm, a torch nozzle movably supported on a distal end of the housing, a shaft movably mounted in the housing and movable in response to the movement of the torch nozzle, and switch means mounted in the housing and actuatable in response to a movement of the shaft for generating a signal to stop the movement of the robot arm.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a side elevational view, with parts in cross section, of a welding torch according to another embodiment of the present invention, the welding torch being properly positioned in a teaching process;

FIG. 12 is a cross-sectional view taken along line X—X of FIG. 7, showing only an inner central portion of the torch.

DETAILED DESCRIPTION OF THE PREFERRED EMBODIMENTS

Figure 1:
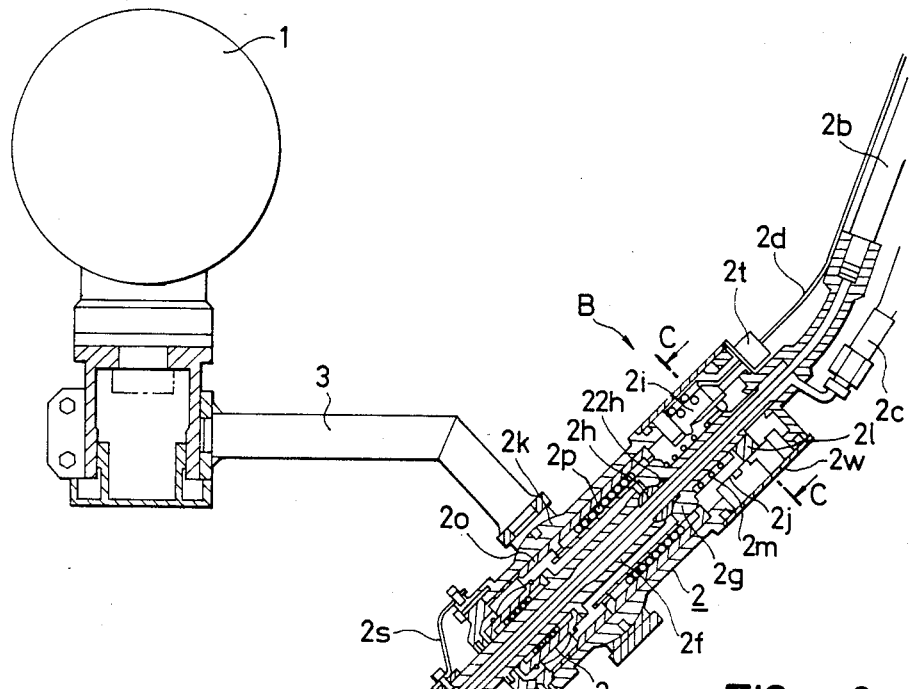
FIG. 1 is a side elevational view, partly in cross section, of a welding torch according to the present invention, the welding torch being in a proper teaching position.

FIGS. 1 through 6 illustrate a welding torch constructed in accordance with one embodiment of the present invention.

An articulate arc welding robot has an arm end 1 including a connector arm 3. A welding torch 2 with a mechanism for preventing the torch from being deformed on collision is supported on the connector arm 3. The welding torch 2 comprises a torch nozzle 2a, a conduit 2b for feeding a welding rod or wire electrode, a gas tube 2c for supplying inert gas to the area of the weld, a signal cable 2d for delivering a signal from a limit switch (described later), and a current conducting cable 2e. A hollow cylindrical center shaft 2f has one end coupled to the nozzle 21 and the other end shaped as a conical portion. The center shaft 2f has an axial central through hole for the passage of the welding rod fed through the conduit 2b and the inert gas supplied by the gas tube 2c, and also includes a central flange projecting radially outwardly. A hollow cylindrical switch shaft 2g has at one end a hollow cylindrical recess in which the conical end of the center shaft 2f can move radially, a conically shaped portion and a hollow cylindrical slot contiguous thereto at a central portion, and at the other end a stepped cylindrical portion for actuating the limit switch and a cylindrical portion contiguous thereto. The switch shaft 2g also has an axial central through hole for the passage of the welding rod and the inert gas supplied through the conduit 2b and the gas tube 2c, respectively. A ball shaft 2h has at one end partly spherical portions held against the conical portions of the center shaft 2f and the switch shaft 2g, and at the other end a cylindrical portion 22h received with a force fit in the hollow cylindrical recess contiguous to the conical portion of the switch shaft 2g. The ball shaft 2h also has an axial central through hole for the passage of the welding rod and the inert gas fed through the conduit 2b and the gas tube 2c, respectively. The limit switch, which is denoted by 2i, can be actuated by an axial movement of the switch shaft 2g to generate a stop signal delivered over the signal cable 2d to a control means (not shown), for stopping the movement of the arm end 1 of the robot arc welder.

Figure 2:
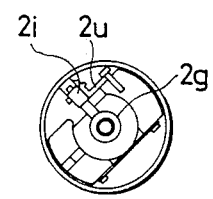
FIG. 2 is a cross-sectional view taken along line C—C of FIG. 1.
Figure 3:
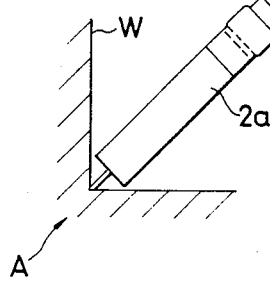
FIG. 3 is an end view as seen in the direction of the arrow A of FIG. 1.
Figure 4:
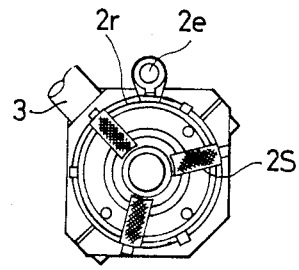
FIG. 4 is a fragmentary side elevational view as seen in the direction of the arrow B of FIG. 1, with a cover removed.

Designated at 2j is a rotation prevention cover. A housing 2k has a partly spherical portion on its outer peripheral surface. The housing 2k also has in one end a through hole and in the other end a recess in which the limit switch 2i and the rotation prevention cover 2j are fixedly mounted. The center shaft 2f, the switch shaft 2g and the ball shaft 2h are accommodated in the housing 2k for axial movement in unison. A retainer 2l is assembled in position between the switch shaft 2g and the housing 2k and has a central through hole in which the switch shaft 2g is axially slidably received. The retainer 2l also has in one end a recess allowing an actuator arm of the limit switch 2i to be normally kept out of interference with the switch shaft 2g, and in the other end a cavity in which the retainer 2l engages the rotation prevention cover 2j. A compression coil spring 2m acts between the switch shaft 2g and the retainer 2l to force the switch shaft 2g in the axial direction to support the center shaft 2f fixed to the torch nozzle 2a through spherical contact with the ball shaft 2h. A composite bearing 2n includes a central stroke bearing 2p (described later) which is axially movable and rotatable about its own axis, and a spherical plain bearing disposed at a periphery thereof for allowing radial tiltable movement. The stroke bearing 2p extends in surrounding relation to the central shaft 2f with its outer peripheral surface located in a space in the housing 2k and its inner peripheral surface disposed around the cylindrical portion of the switch shaft 2g. The spherical plain bearing of the composite bearing 2n is mounted in the housing 2k through the intermediary of a spacer 2o. The composite bearing 2n and the spacer 2o are fixed by a bracket 2q to a hollow cylindrical portion of the housing 2k. The current conducting cable 2e is electrically coupled to a conductive spacer 2r electrically connected to the torch nozzle 2a through a plurality of bendable lead wires 2s such as braided copper wires (FIG. 3). The limit switch 2i is electrically coupled to a connector 2t and attached to the housing 2k by a plate 2u (FIG. 2). The limit switch 2i is covered by a cover 2w.

Figure 5:
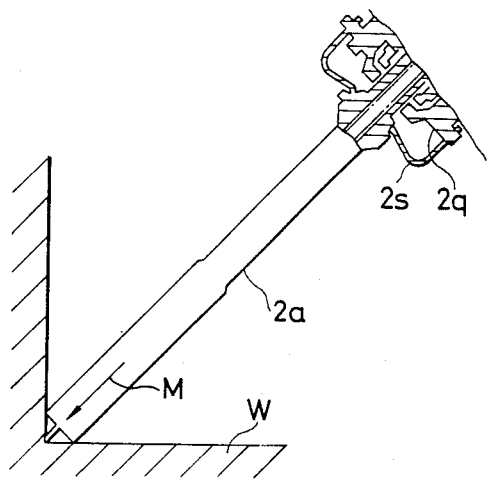
FIGS. 5 and 6 are fragmentary side elevational views of a torch nozzle as it collides with the work from different directions.
Figure 6:
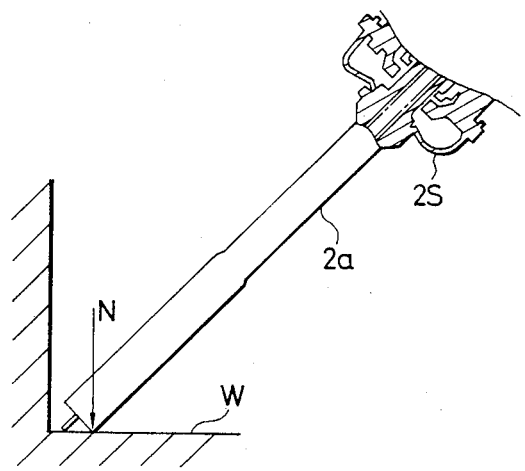
Figure 8:
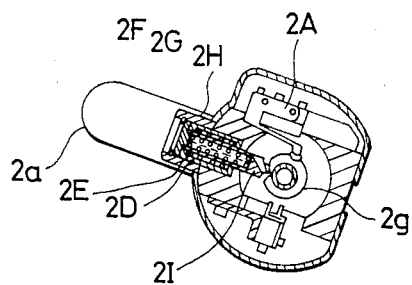
FIG. 8 is a cross-sectional view taken along line V—V of FIG. 7, the view showing the welding torch angularly displaced 180° from the position of FIG. 7.

The teaching operation of the welding torch thus constructed proceeds as follows in the case of an accidental collision: When the torch nozzle 2a is collided with the work W in the direction of the arrows M or N, as shown in FIG. 5 or 6, through carelessness of the operator while welding positions are being taught to the robot, reactive forces due to the collision are imparted from the torch nozzle 2a successively through the center shaft 2f and the ball shaft 2h to the switch shaft 2g, which is caused to slide axially in the housing 2k. The switch shaft 2g then moves the actuator arm of the limit switch 2i to bring its contacts into mutual contact. The limit switch 2i issues a signal to stop the movement of the robot, thus making the operator aware of the torch collision brought about through the erroneous action. Knowing that this collision has occurred, the operator can now retract the welding torch 2 to the position assumed prior to the collision, and continue the teaching process from that position.

FIGS. 7 through 12 show a welding torch according to another embodiment of the present invention. The welding torch includes a curved nozzle which has a greater tendency to erroneously collide at its distal end with the work during the robot teaching process.

The welding torch, generally indicated at 2, has a mechanism for preventing the curved nozzle from being deformed upon collision and is supported by the connector arm 3 on the arm end 1 of the articulate arc welding robot. The welding torch 2 includes a center shaft 2f having one end secured to the curved nozzle, indicated at 2a, and the other end shaped in a conical configuration. The center shaft 2f has an axial through hole serving as a passage for the welding rod or wire electrode and the inert gas supplied as aforementioned. The center shaft 2f also has a plurality of V-shaped grooves 2x (FIG. 12) defined in its central outer periphery. The welding torch 2 includes a switch shaft 2g, a limit switch 2i for controlling axial movement of the switch shaft 2g, and a rotation prevention cover 2j. A composite bearing 2n has a central stroke bearing 2p axially movable and rotatable about its own axis, and a spherical plain bearing disposed at a peripheral portion for allowing radial tiltable movement. The stroke bearing 2p is disposed in surrounding relationship to the center shaft 2f. The stroke bearing 2p has an outer peripheral surface positioned in a space in the housing 2k and an inner peripheral surface mounted on a cylindrical portion of the switch shaft 2g. The limit switch 2i is attached to the housing 2k by a plate 2u. The switch shaft 2g is controlled in its rotational movement by a limit switch 2A. Leaf spring pins 2B have leaf springs 2y secured as by riveting to an axial end of the switch shaft 2g and supporting semispherical bodies resiliently forced respectively into the V-shaped grooves 2x in the center shaft 2f (FIG. 12). The spherical plain bearing is mounted in the housing 2k through a spacer 2o interposed therebetween.

The mechanism for positioning the switch shaft 2g in its rotational direction comprises a ball shaft 2I (FIGS. 8 and 11) having a semispherical distal end, a stroke bearing 2D for supporting the ball shaft 2I in its axial movements, a compression coil spring 2E, a cap 2F, a retaining ring 2G, and a casing 2H. Other parts in FIGS. 7 through 12 are denoted by like or corresponding reference characters in FIGS. 1 through 6, and will not be described in detail.

Figure 11:
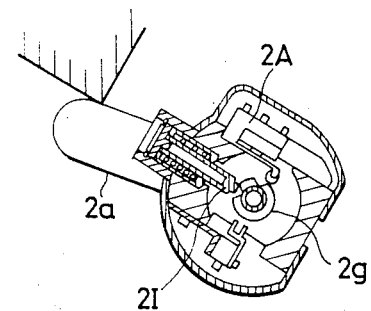
FIG. 11 is a cross-sectional view of the welding torch shown in FIG. 8, showing the welding torch striking the work in a different manner.
Figure 9:
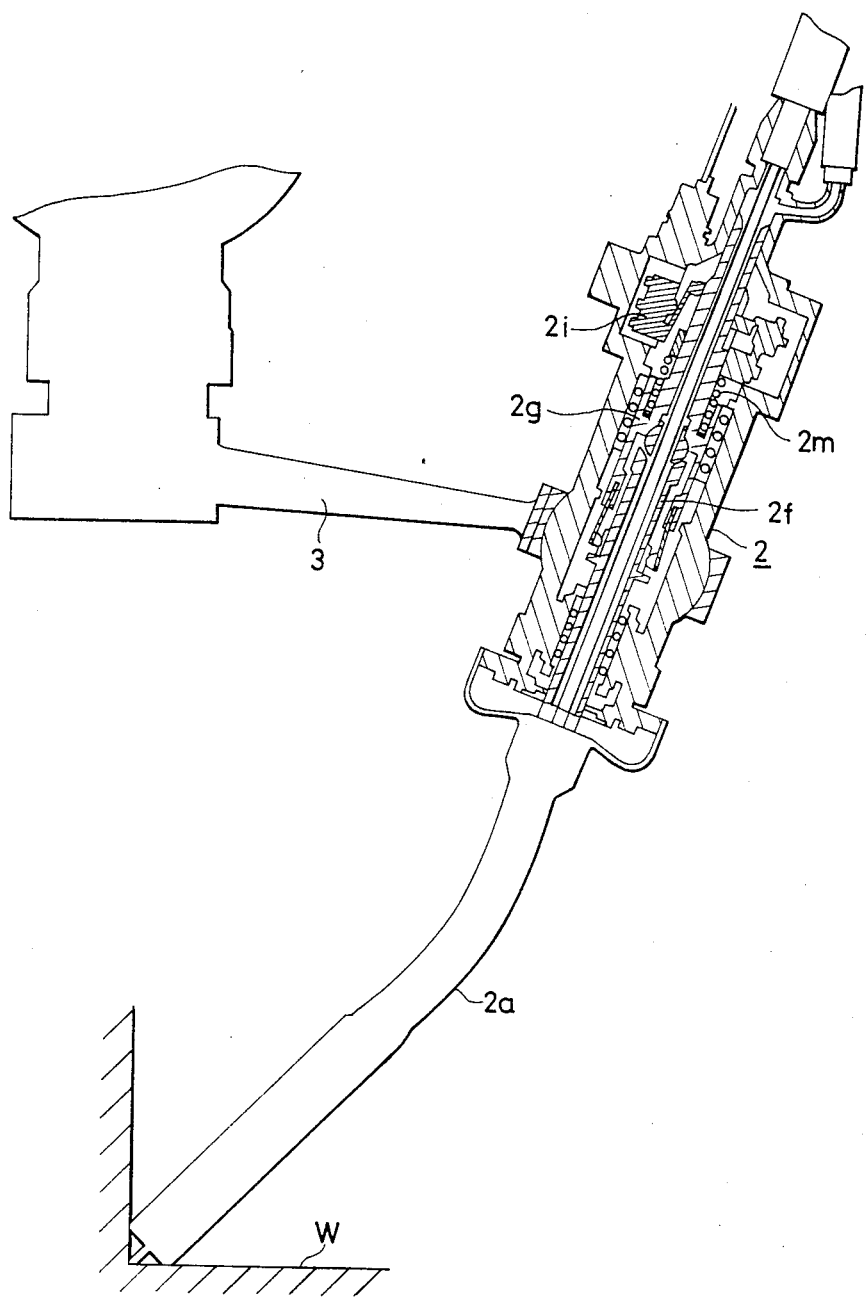
FIGS. 9 and 10 are side elevational views, partly in cross section, of the welding torch of FIG. 7, illustrating different manners in which the welding torch may hit the work.
Figure 10:
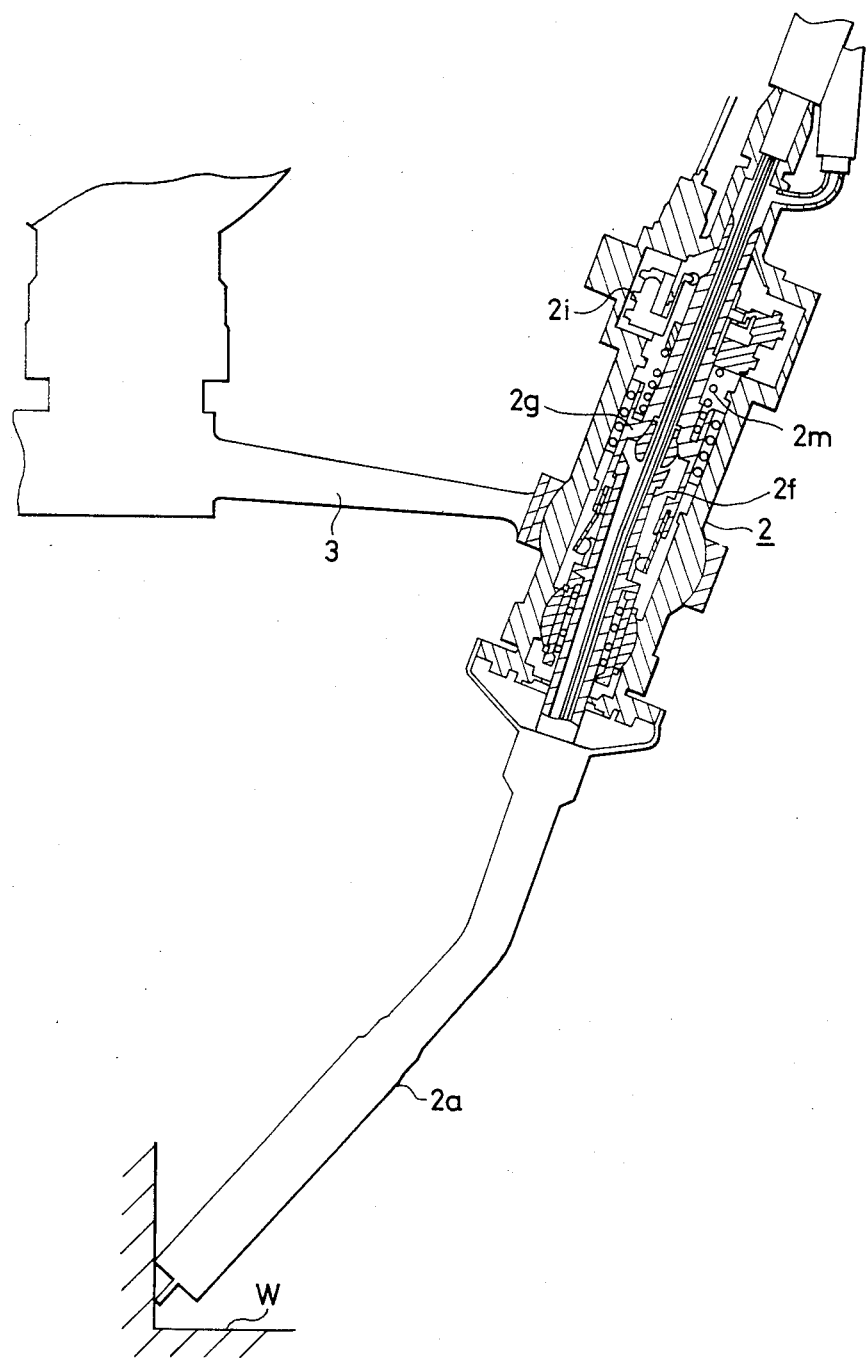

When the curved torch nozzle 2a happens to hit the work, as shown in FIGS. 9, 10 or 11 through inadvertence of the operator while the robot is being taught welding positions, the curved torch nozzle 2a pushes or rotates the switch shaft 2g through the center shaft 2f and the ball shaft 2h until actuator arms of the limit switches 2i or 2A located closely to the switch shaft 2g are depressed. The limit switches 2i, 2A issue signals to stop the movement of the robot. The operator is thus informed that the welding torch has inadvertently been brought into a collision with the work, and can withdraw the welding torch back to a proper position assumed prior to the collision.

With the arrangement of the present invention, after the torch has hit the work, the welding torch is prevented from being deformed or otherwise damaged, and can be moved along from the colliding position to continuously teach the robot. Since it is not necessary to repeat the entire teaching process as has conventionally been required due to the deformation or damage of the welding torch resulting from the collision, the teaching time is greatly reduced and the operator is relieved of undue mental fatigue.

Although certain preferred embodiments have been shown and described, it should be understood that many changes and modifications may be made therein without departing from the scope of the appended claims.

What is claimed is:

1. A welding torch for use in a welding robot having a robot arm, comprising:
   (a) a housing adapted to be supported at a distal end of the robot arm;
   (b) a torch nozzle movably supported at a distal end of said housing;
   (c) switch shaft means movably supported in said housing and axially movable in response to the movement of said torch nozzle; and
   (d) collision indicating means comprising limit switch means mounted in said housing and actuatable in response to the retraction of said switch shaft means further into said housing for generating a collision signal indicative of a collision between said torch nozzle and a workpiece and means for stopping the movement of the robot arm in response to said collision signal.

2. A welding torch according to claim 1, including means for supporting said switch shaft means so as to be axially movable within said housing.

3. A welding torch according to claim 2, wherein said switch shaft means is connected to said torch nozzle.

4. A welding torch according to claim 2, said housing being rotatably supported at the distal end of said robot arm.

5. A welding torch according to claim 2, wherein said torch nozzle is curved.

6. A welding torch according to claim 2, wherein said switch means includes therein a passage for supplying a welding material to said torch nozzle.

7. A welding torch according to claim 2, including resilient means disposed in said housing and normally resiliently urging said switch shaft means in a direction toward said torch nozzle.

8. A welding torch according to claim 2, wherein said switch shaft means comprises a first shaft member coupled to said torch nozzle and a second, relatively pivotable shaft member movable in response to the movement of said first said shaft member, said first and second shaft members being axially movably supported in said housing.

9. A welding torch according to claim 2, wherein said switch shaft means comprises a first shaft member coupled to said torch nozzle, and a second shaft member pivoted to said first shaft member and movable in response to the movement of said first shaft member said limit switch means being actuatable in response to the movement of said second shaft member for generating the signal for stopping the movement of the robot arm.

10. A welding torch according to claim 2, wherein said switch shaft means comprises a first shaft member coupled to said torch nozzle, and a second shaft member pivoted to said first shaft member and movable in response to the movement of said first shaft member; resilient means disposed in said housing and normally resiliently urging said first and second shaft members in a direction toward said torch nozzle, said first and second shaft members comprising hollow cylinders including central spaces for the passage of a welding material; and bearings for axially movably mounting said first and second shaft members in said housing.

11. A welding torch according to claim 1, including means supporting said torch nozzle so as to be axially movable and rotatable about its own axis with respect to said housing.

12. A welding torch according to claim 11, wherein said switch shaft means is connected to said torch nozzle.

13. A welding torch according to claim 11, said housing being rotatably supported on the distal end of said robot arm.

14. A welding torch according to claim 11, wherein said torch nozzle is curved.

15. A welding torch according to claim 11, wherein said switch shaft means includes therein a passage for supplying a welding material to said torch nozzle.

16. A welding torch according to claim 11, including resilient means disposed in said housing and normally resiliently urging said switch shaft means in a direction toward said torch nozzle.

17. A welding torch according to claim 11, wherein said switch shaft means comprises a first shaft member coupled to said torch nozzle and a second shaft member movable in response to the movement of said first shaft member, said first and second shaft members being axially movably supported in said housing.

18. A welding torch according to claim 11, wherein said switch shaft means comprises a first shaft member coupled to said torch nozzle and a second shaft member movable in response to the movement of said first shaft member, said limit switch means being actuatable in response to the movement of said second shaft member for generating the signal for stopping the movement of the robot arm.

19. A welding torch according to claim 11, wherein said switch limit means includes a first switch actuatable in response to an axial retraction of said torch nozzle and a second switch actuatable in response to rotation of said torch nozzle.

20. A welding torch according to claim 11, wherein said shaft means comprises a first shaft member coupled to said torch nozzle and a second shaft member rotationally and axially movable with said first shaft member; resilient means disposed in said housing and normally resiliently urging said first and second shaft members in a direction toward said torch nozzle, said first and second shaft members comprising hollow cylinders including central spaces for the passage of a welding material; and bearings for axial movably mounting said first and second shaft members in said housing, said second shaft member being resiliently fitted over an outer peripheral surface of said first shaft member.

21. A welding torch for use in a welding robot having a robot arm, comprising;
   (a) a housing adapted to be supported at a distal end of the robot arm;
   (b) a torch nozzle movably supported at a distal end of said housing;
   (c) switch shaft means movably supported in said housing and axially movable in response to the movement of said torch nozzle; and
   (d) limit switch means mounted in said housing and actuatable in response to retraction of said switch shaft means further into said housing to generate a signal indicative of a collision between said torch nozzle and a workpiece for stopping the movement of the robot arm;
said limit switch means including a first switch actuatable in response to an axial retraction of said torch nozzle and a second switch actuatable in response to rotation of said torch nozzle.

* * * * *